United States Patent

Jones

[15] 3,676,710

[45] July 11, 1972

[54] LOW-LEVEL SIGNAL DETECTOR CIRCUIT

[72] Inventor: David A. Jones, Burnsville, Minn.

[73] Assignee: Control Data Corporation, Bloomington, Minn.

[22] Filed: Feb. 16, 1971

[21] Appl. No.: 115,359

[52] U.S. Cl. ..... 307/289, 307/247, 307/291
[51] Int. Cl. ..... H03k 3/26, H03k 3/286
[58] Field of Search ..... 307/289, 291, 247

[56] References Cited

UNITED STATES PATENTS 3,178,592 4/1965 Fischer et al ..... 307/291 X
3,510,689 5/1970 Baker ..... 307/291 X Primary Examiner—John Zazworsky
Attorney—Joseph A. Genovese, Edward Schwarz and Paul L. Sjoquist

[57] ABSTRACT

Method and apparatus for increasing the sensitivity of several flip-flop designs to duplex binary signals too weak to affect the state of the flip-flop during normal operation. For detecting practically any type of weak signal, sensitivity can be dramatically improved by dropping power to the flip-flop and then reapplying power while the signal is being applied to the flip-flop terminals. In addition, when bipolar pulses are to be detected, capacitors interposed between the signal source and the flip-flop terminals can be grounded during the first quarter of the signals and disconnected from ground for the remaining portion of the signal. This effectively doubles the maximum signal voltage applied to each flip-flop terminal.

8 Claims, 6 Drawing Figures

INVENTOR
DAVID A. JONES
BY
Edward Schwarz
ATTORNEY

INVENTOR
DAVID A. JONES
BY
Edward Schwarz
ATTORNEY

INVENTOR
DAVID A. JONES
BY
Edward Schwarz
ATTORNEY

LOW-LEVEL SIGNAL DETECTOR CIRCUIT

BACKGROUND OF THE INVENTION

1. Field of the Invention

This invention is used for recording the data content of weak duplex signals. A duplex signal comprises two different, single signals. Each single signal is transmitted on a separate conductor and will be referred to as half a duplex signal. A duplex signal has a binary value of 0 to 1 depending on which conductor carries a particular half. Signals 501, 502 and 503 of FIG. 5 are examples of duplex signals. The solid lines indicate one binary value, the dotted lines indicate the other. The term "duplex signal" is taken to mean hereafter that part of the pair of signals containing data. Thus, only when pulses are present in the FIG. 5 examples are duplex signals considered present. A pair of DC signals, one relatively positive to the other, comprise a duplex signal only so long as they maintain such a relationship.

2. Description of the Prior Art

In the past, signals of insufficient strength to reliably set flip-flops were amplified before being applied to the flip-flop. This is an obvious and effective solution in most cases. However, when important design parameters include minimizing power drain, weight, and volume of the device, straight-forward amplification techniques are less desirable. This invention in many cases makes weak-signal amplification unnecessary in setting the flip-flop properly.

SUMMARY OF THE INVENTION

The invention comprises apparatus and methods for causing a flip-flop to respond to a duplex signal not strong enough to alter the state of the flip-flop when receiving normal operating power. Two different techniques are involved. The first, power strobing, involves removing, and then reapplying power to the flip-flop at the time the signal to be detected is being applied to the input terminals of the flip-flop. If a DC data signal is to be recorded, it is only necessary that power be reapplied while the DC signal is present. If, however, pulse data is to be recorded, the reapplication of power must be properly synchronized with the arrival of the pulse at the flip-flop input terminals. With appropriate modifications, this technique may be used with almost all of the types of logic circuitry now in use.

The second technique, signal to ground strobing, may be used only in detecting bipolar pulses, such as shown in FIG. 5, ref. 503. With some types of flip-flops, it may be used only in conjunction with power strobing because current drawn by these flip-flops becomes otherwise excessive. Signal to ground strobing requires connecting the signal source capacitively to the flip-flop input terminals. The input terminals are grounded until the first signal peaks 509 (FIG. 5) occur. The capacitors are charged by the signal halves pulses during this time. Between the two peaks of the signals, the capacitors are ungrounded. The residual charges on the capacitors act to reinforce the signal voltages at the second peaks, thus in theory doubling the effective voltage applied to the flip-flop input terminals. This technique has particular utility in signal output detection from those computer memories which normally do, or can be designed to generate bipolar output signals.

Accordingly, one object of this invention is to increase the sensitivity of flip-flops to low level signals at a minimum increase of hardware.

A second object of this invention is to decrease total power consumption of logic flip-flops receiving low lever signals.

A third object is to shorten time between emission of weak signals and earliest availability of the flip-flop output.

FIG. **3*a*** is a simplified circuit of a complementary metal oxide silicon type flip-flop.

Figure 5:
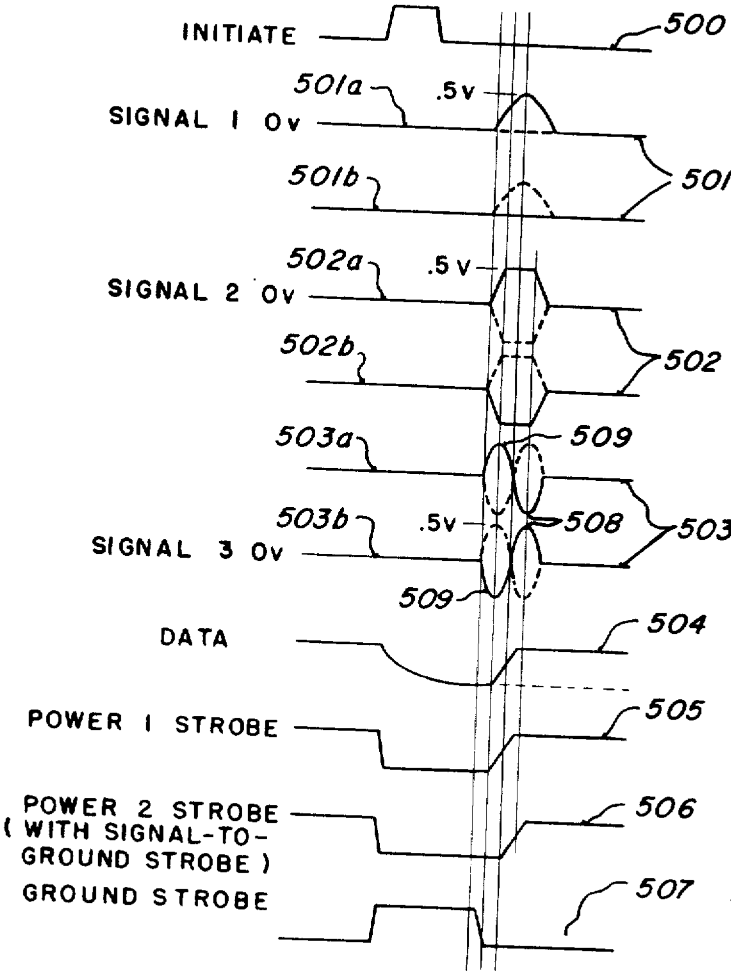

FIG. 5 shows plots of signals associated with the invention.

DETAILED DESCRIPTION OF THE EMBODIMENTS

Figure 1:
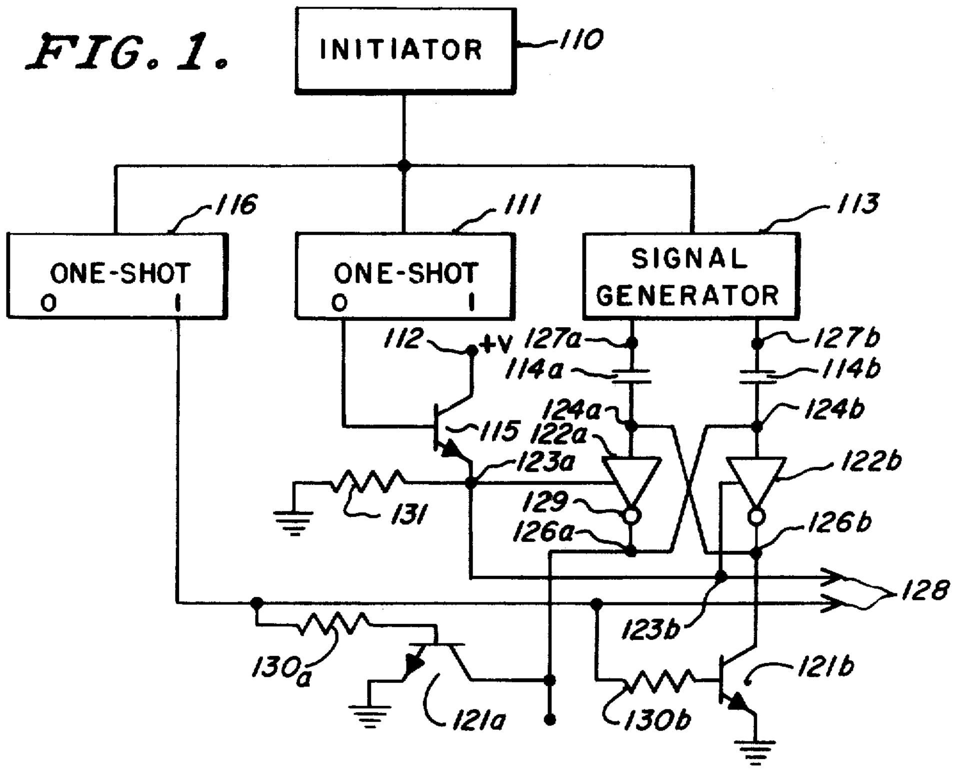
FIG. 1 is a logic diagram illustrating the invention.

In FIG. 1, inverters **122*a* and 122*b* are interconnected to form a flip-flop. Considering inverter 122*a*, it has one input terminal 124*a* and one output terminal 126*a*. Signal levels associated with inverter 122*a*, as well as with all other logic circuitry discussed are 0 volts corresponding to a logical 0 and 2.5 volts corresponding to a logical 1, unless otherwise stated. Inverter 122*a* produces a logical 1 output if a logical 0 is applied at input terminal 124*a* and the output is not grounded. The small circle 129 is the conventional symbol for inversion. Similarly if input terminal 124*a* receives a logical 1, output terminal 126*a* will produce a logical 0. If no signal is applied to input terminal 124*a***, the effect is as though a logical 0 (0 volts) were being applied.

To briefly explain the cooperation of inverters **122*a* and 122*b* as a flip-flop, assume that it is desired to apply input signals to the flip-flop causing output of terminal 126*b* to become a logical 0 and the output of terminal 126*a* is logical 1. A logical 0 signal applied to terminal 124*a* sufficient to overcome the effect of a possible logical 1 issuing from terminal 126*b* and hold both close to 0 v. is needed. Input terminal 124*b* must receive a logical 1 signal or no input signal at all. The logical 0 at terminal 124*a* causes output terminal 126*a* to become a logical 1. This logical 1 is applied to input terminal 124*b* via the connection to it from terminal 126*a* and holds the output of inverter 122*b* at logical 0 even after the input signals are removed from input terminals 124*a* and 124*b*. By reversing signal level inputs to terminals 124*a* and 124*b***, the flip-flop state can be reversed.

Operation of the apparatus of FIG. 1 starts with emission of an initiate pulse 500 (shown in FIG. 5) from initiator 110. This initiate pulse travels to signal generator 113. (For the first part of this discussion assume transistors **121*a* and 121*b* are kept cut off.) A known time following the initiate signal, signal generator 113 produces the duplex signals to be detected at its output terminals 127*a* and 127*b*. These signals have a maximum voltage excursion insufficient to change the state of the flip-flop while it receives normal operating power. Typical signals from signal generator 113 are shown as waves 501, 502 and 503 of FIG. 5. For convenience, the upper half of each signal in FIG, 5 may be thought of as being emitted by terminal 127*a* and the lower by 127*b*. Each pair of signals contains a single bit of data. The dotted lines in each wave indicate the alternative signal. Signal generator 113 itself may be a computer memory or other source of duplex signals significantly weaker than usual logic level signals. Pulses 501 and 503 shown in FIG. 5 approximate sine wave curves. The apparatus being described will, however, operate effectively when receiving trapezoidal wave 502, weak saw tooth pulses, or any other type of low-strength pulse. The signals are applied to flip-flip terminals 124*a* and 124*b* through DC blocking capacitors 114*a* and 114*b*** (necessary only if a DC component is present in an AC duplex signal, or if signal to ground strobing is used).

Initiator 110 also transmits the initiate signal to one-shot 111. A one-shot is a circuit producing a pair of complementary outputs similar to a flip-flop. In its cleared state, a one-shot multivibrator produces a logical 1 at its "0" output terminal and a logical 0 at its "1" output terminal. But upon receiving a logic pulse at its input terminal, a one-shot reverses the logic levels at its output terminals. These reversed logic levels are maintained for a preset time and then reset to their original condition. The "0" output of one-shot 111 is applied to the base of NPN transistor 115. Transistor 115 acts as a switch connecting and disconnecting the supply voltage at terminal 112 to power terminals **123*a* and 123*b* of inverters 122*a* and 122*b* respectively, responsive to the "0" output, or connect and disconnect signal from one-shot 111. One-shot 111, following each initiate signal is set holding base of transistor 115 at 0 volts. Thus, at this time it is cut off and power is removed from inverters 122*a* and 122*b*. One-shot 111 will be in its reset condition at all times but for the period of the one-shot time constant following each initiate pulse. While reset, it generates a connect signal causing transistor 115 to conduct and supply power to the inverters. Since the power voltages for logic circuitry must in general, substantially exceed the logic signal voltages produced, the logical 1 output of the "0" output of one-shot 111 must be chosen to apply proper operating voltage to inverters 122***a* and 122*b* higher than the presumed 2.5 v. logical 1 signal. Specifically, the emitter-follower configuration of transistor 115, if it is a silicon device, requires its base to be 0.6 v. higher than the operating power voltage of the inverters for them to receive their design voltage. This is so because the PN junction drop of silicon is 0.6 v. In the particular circuits which I employ, 5.0 v. power is required, necessitating one-shot 111 "0" output logical 1 (connect signal) voltage be 5.6 v.

The first of the three requirements that must be satisfied in choosing one-shot 111's time constant is that it be long enough to allow discharge of capacitors 114*a* and 114*b* if the previous signal had charged them, as well as allowing discharge of inter-element capacitances within the inverters. Secondly, transistor 115 should be allowed to cut off completely. Third, the time constant must cause power voltage to reach its latching value during maximum duplex signal voltage. By latching voltage is meant a power voltage level which will maintain the proper setting of the flip-flop even though signal voltage is moving again toward zero on the trailing edge of the signal. The latching voltage is close to the minimum operating voltage.

For maximum sensitivity, power voltage must reach its threshold value one logic level delay time before maximum signal voltage is attained. The threshold power voltage is that which allows a detectable amount of current to be drawn by inverters 122*a* and 122*b*. The logic level delay time is the time, usually less than 50 nsec., between a change in the input signal of an inverter and the resulting change in the output. This requirement is co-ordinated with the time power voltage reaches its latching level by setting the slope of the power voltage rise. This in turn is controlled by a) proper slope of one-shot 111's "0" output signal as it resets to a logical 1 and b) proper response of transistor 115. Also, impedance of transistor 115 should decrease smoothly. These requirements may be varied somewhat, causing decreased sensitivity. Sensitivity is affected more adversely by reaching latching voltage after the signal peak than by any other deviation from the described ideal.

An example of these time relationships is displayed by signal wave forms 501 and 502 of FIG. 5 on the one hand and power voltage wave 505 on the other. Normally, a very short time is sufficient to allow capacitor discharge through resistor 131 and transistor 115 to cut off. In the response of signal generator 113 is too rapid, a one-shot or other delay may be placed between it and initiator 110 for proper synchronization. Other means may also be employed to synchronize these signals and can easily be implemented by those skilled in the art. The invention also contemplates a rate of power voltage rise significantly greater than the signal voltage rise as shown in FIG. 5. While detection will still occur with a slower power voltage rise rate, the sensitivity will be adversely affected.

An operational system, which I have designed may be used as a typical example of timing involved in detecting signal 501. The circuits have a threshold voltage of 0.6 v., a latching voltage of 3.0 v. and a logic level delay time of 25 nsec. for inverters 122*a* and 122*b*. If power voltage increases linearly, it should reach 0.6 v. 75 nsec. after the start of the signal pulse and 3.0 v. at 100 nsec., the signal peak. Thus one-shot 111 should reset so as to cause voltage on inverter power terminals 127*a* and 127*b* to start rising from 0 v. at approximately 70 nsec. from the start of the signal. If there is a 24 nsec. response delay in transistor 115, then one-shot 111 should start resetting at 45 nsec. Capacitors 114*a* and 114*b* will discharge in a few hundred nanoseconds since the ones used have a capacitance less than 100 pfd. Since the response time of the signal generator 113 used is 1 usec., no extra one-shot is needed to delay its output. The time constant of one-shot 111 should be 1.045 usec. if signal generator response is exactly 1.00 usec.

The sequence of events in detecting the single duplex signal pulse 501 then starts with emission of an initiate signal. This causes power to be removed from the flip-flop and reapplied simultaneously with the arrival of the suplex signal at the flip-flop input terminals. As the flip-flop reaches its normal operating state again it will be set indicating the data content of the duplex signal. Output at terminal 126*b* will follow solid data signal 504.

The flip-flop formed from inverters 122*a* and 122*b* is not limited to detecting pulse or AC signals only. Low level DC signals can also be recorded. It is only necessary that power be applied to the flip-flop during the DC signal's existence. Capacitors 114*a* and 114*b* must be shorted to allow the DC signal to reach inverters 122*a* and 122*b*.

The increased sensitivity to signals results from the fact that during the powering up of most kinds of flip-flops, they are in a very sensitive state. I have determined empirically that during this time very small signals applied to the clear (reset) and/or set terminals will be sufficient to determine the final setting of the flip-flop with a high degree of reliability. The theoretical reason for this behavior can be better explained by reference later to specific circuits.

The second technique, signal to ground strobing, may be employed to further increase sensitivity of the flip-flop to bipolar pulses 503. One-shot 116 is activated to emit ground strobe signal 507. Capacitors 114*a* and 114*b* must be present. As the initiate signal is emitted by initiator 110, one-shot 116 is set, causing its "1" output to become a logical 1. The "1" output of one-shot 116 is connected to the bases of NPN transistors 121*a* and 121*b* by resistors 130*a* and 130*b*. When one-shot 116 is set by the initiate signal, transistors 121*a* and 121*b* conduct, grounding input terminals 124*a* and 124*b*. Signals such as the logical 1 from one-shot 116 will be referred to as ground signals, although the flip-flop input terminals so affected may not be actually held at 0 v. in some embodiments.

Assume that capacitor 114*a* receives half signal 503*a* and capacitor 114*b* received half signal 503*b*, each half having 0.5 v. excursions and 200 nsec. length. After having grounded input terminals 124*a* and 124*b* until the 50 ns. points 509 of the signals are reached, one-shot 116 resets and cuts off transistors 121*a* and 121*b* by changing its "1" output to a logical 0, i.e. becomes an "unground" signal. Because terminal 124*a* has been held to +0.2 v. by transistor 121*b*, (assume 0.2 v. collector-emitter drop when saturated) capacitor 114*a* has at this time a net charge of approximately +0.3 v. measured from terminal 124*a* to terminal 127*a*. Capacitor 114*b* has a charge of −0.7 v. from terminal 124*b* to terminal 127*b* because the collector of transistor 121*a* was held at +0.2 v. At signal points 509 wave 503*a* starts becoming less positive and wave 503*b* starts becoming less negative. As the voltage of each wave swings through 0 v. toward their 150 ns. points 508 opposite each's 50 nsec. polarity, capacitors 114*a* and 114*b*, being no longer grounded maintain close to their original voltage. At 150 ns. points 508 capacitor 114*a* will still have approximately +0.3 v. across it but since terminal 126*a* is at −0.5 v., terminal 124*a* will be at −0.8 v. Similarly, when terminal 127*b* reaches +0.5 v., capacitor 114*b*, having approximately −0.7 v. across it, will force terminal 124*b* to +1.2 v. These voltages are to be contrasted with the +0.5 v. maximum voltage available when this technique is not used. Before reaching points 508, one-shot 111 must reset, reapplying flip-flop power, as shown in power wave 506. The flip-flop will now set with terminal 126*a* emitting a logical 1. If the signals followed the dotted line waves of signal 503 instead, the flip-flop would set with terminal 126*a* emitting a logical 0. The times when threshold and latching levels should be attained by power voltages are subject to the same requirements as when power strobing was employed alone. However, maximum voltage in the bipolar signal case when signal to ground strobing is used occurs at the second voltage peak 508. Power strobing times are made relative to this peak. One-shot 111 set time and reset voltage slope specifications need not be changed. The net result of causing transistors 121*a* and 121*b* to conduct and cut off at the specified times is to increase apparent signal voltage swing at input terminals 124*a* and 124*b* by roughly a factor of 2.

One-shot 116 and transistor 115 can be used to supply a signal to ground strobe signal and power, respectively, to a plurality of flip-flops, as indicated by conductor extensions 128. Transistors 121*a* and 121*b* would of course have to be duplicated for each flip-flop for signal to ground strobing. As will be seen in discussing FIGS. 2 and 3*b*, however, transistors 121*a* and 121*b* or their equivalent are already present "free" in many commercially available flip-flop packages.

Figure 2:
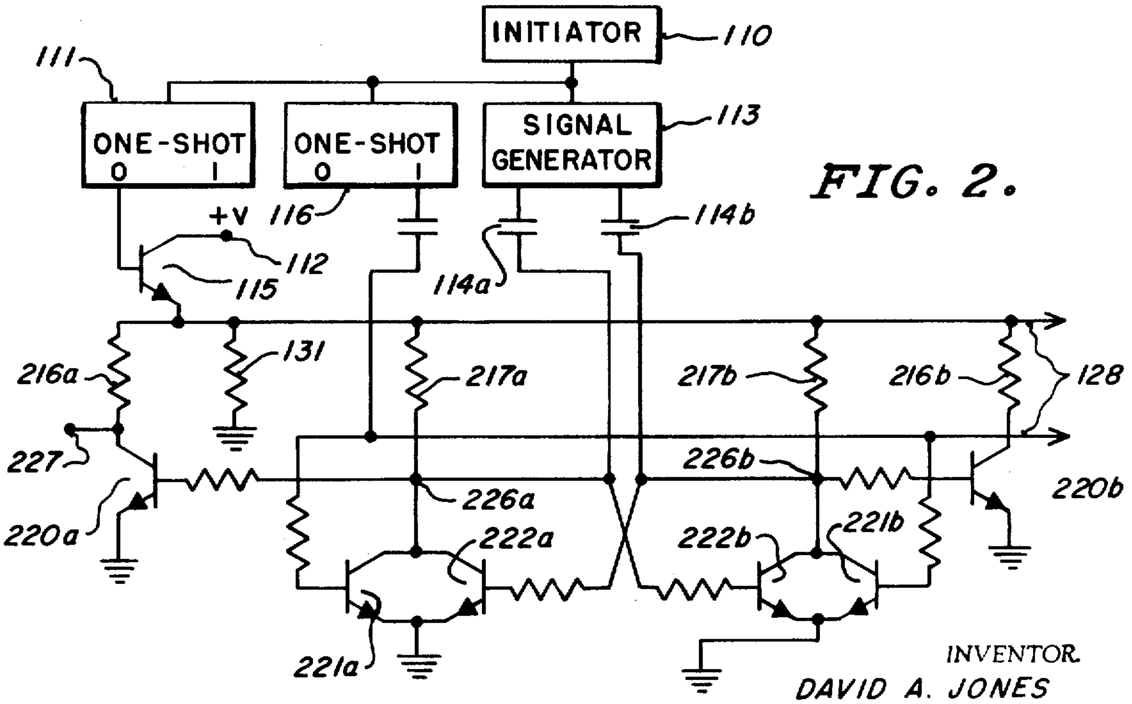
FIGS. 2 **3*b* and 4** are circuit diagrams of certain flip-flop types illustrating means for adapting the invention to them.

Referring to FIG. 2, we see the invention implemented in a resistor-transistor logic (RTL) circuit. Such a circuit is widely available as an inexpensive microcircuit containing all transistors (except for transistor 115) shown in FIG. 2, as well as the associated resistors and most of the connections between these components. Transistors 221*a* and 222*a*, e.g. along with their associated base resistors and their common collector resistor 217*a* usually are used as one NOR gate of a flip-flop. If either transistor 221*a* or 222*a*, or both receive a logical 1 signal, the base-emitter junction of that transistor will be forward biased and the transistor will hold the commonly connected collectors of both to essentially ground. Similarly, if both transistors 221*a* and 222*a* are receiving logical 0 signals, both transistors will be cut off and their collectors will hold point 226*a* at 2.5 v., a logical 1. Both of these transistors operates singly as an inverter. Similarly transistors 221*b* and 222*b* along with their associated circuitry comprise in concert a NOR gate and singly, inverters. Connections between one transistor of each NOR gate complete the flip-flop circuit. This is shown as the connections between bases and collectors of transistors 222*a* and 222*b*.

Transistor 220*a* is connected through its base resistor to terminal 226*a* to provide an inverted output of the logic value at terminal 226*a*. This inverted value appears at the collector of transistor 220*a*, terminal 227. Terminal 227 corresponds in a general way to terminal 126*a* of FIG. 1, but the output of terminal 227 is the inversion of the output of the inverter comprising transistor 222*a*. Since this inversion corresponds to the logical value emitted by transistor 222*b*it is merely a matter of convention to determine from output at terminal 227 what the setting of the flip-flop is at any time. The final state of the flip-flop (and the output at terminal 227) can be easily reversed by reversing input signal connections to terminals 226*a* and 226*b*.

Transistor 220*a* provides isolation preventing unbalanced output loads on the flip-flop terminals caused by varying impedance of circuits receiving the output of the flip-flop. An unbalanced load would cause a heavy bias in the setting of the flip-flop toward one value or the other, decreasing sensitivity to small signal inputs and reliability in detecting them. Since transistor 220*a* provides a known impedance load on transistors 221*a* and 222*a*, the effect of this load can be balanced by similar transistor 220*b*, which is connected through its base resistor to the collectors of transistors 221*b* and 222*b*. Less accurate impedance matching may be provided by grounding terminal 226*a* through a resistor whose resistance approximates the impedance of transistor 220*a*. If the flip-flop drives a very high impedance load, both transistors 220*a* and 220*b* may be dispensed with, and terminals 226*a* and 226*b* be used directly as the output signal sources.

Operation of the flip-flop of FIG. 2 is very similar to the generalized operation described for the flip-flop in FIG. 1. Initiator 110 provides an initiate signal which is sent to one-shots 111 and 116 and signal generator 113. The time constant for one-shot 111 is chosen so as to cause power voltage to follow wave form 505. (If the signals are bipolar, 503, and signal to ground strobing is used, power voltage wave form 506 should be used.) Transistors 222*a* and 222*b* have all their elements at ground potential immediately prior to the start of the duplex signal. Assume that signal generator 113 generates a pulse passing through DC blocking capacitor 114*a* and following the solid line part of wave form 501*a*, and that the signal passing through DC blocking capacitor 114*b* follows the solid line portion of wave form 501*b*. (Capacitors 114*a* and 114*b* are needed only if a DC component is present in the signals.) When one-shot 111 begins to reset, voltage at the emitter of transistor 115 begins to rise. (Assume for purposes of explaining power strobing, that transistors 221*a* and 221*b* are kept non-conductive by one-shot 116.) Interelectrode capacitances in transistors 222*a* and 222*b*, and capacitors 114*a* and 114*b* if present, act as current sinks, absorbing current as power is applied to the flip-flop. However, the base-emitter junction capacitance of transistor 222*b*, and capacitor 114*a* both will be partially charged by the signal pulse. Thus, voltage will be higher at terminal 226*a* than at terminal 226*b* initially, and after power voltage has increased slightly. As the impedance of transistor 115 continues to decrease, voltage at terminal 226*b* will rise but during this dynamic phase will never be as high as the voltage at terminal 226*a*. When the voltage at terminal 226*a* becomes great enough so that base voltage of transistor 222*b* reaches threshold value, a very small current starts flowing through transistor 222*b*. As transistor 222*b* conducts more heavily due to its rising base voltage, voltage rise at terminal 226*b* will slow and return to ground potential when transistor 222*b* is fully conductive. Since voltage at terminal 226*b* has never reached the threshold voltage of transistor 222*a*, transistor 222*a* has never conducted more than leakage current, and the steady state condition eventually reached will be full conduction by transistor 222*b* and nonconduction by transistor 222*a*. If the signal outputs from signal generator 113 are reversed, operation is similar with transistor 222*a* finally arriving at full conduction when steady state conditions are reached.

In the hypothetical case just discussed, transistor 222*a* is not conducting, so voltage at terminal 226*b* will be high causing transistor 220*a* to conduct and the voltage at terminal 227 to be low. Thus, if terminals 226*a* and 226*b* receive signals following solid line wave forms 501*a* and 501*b* respectively, the flip-flop will finally set with a logical 0 appearing at terminal 227. If the dotted line portions of signals 501 are followed, transistor 222*a* will conduct heavily and transistor 222*b* will conduct only slightly, causing terminal 227 to emit a logical 1 signal.

If this apparatus is used to detect signals having wave forms 502, the same discussion is appropriate. As a positive pulse passes through one capacitor, a negative pulse passes through the other. Since the only effect of a negative-going pulse in place of a 0 volt signal is to even more completely cut off the transistor receiving the pulse, the effect is the same. If the positive-going pulse passes through capacitor 114*a*, terminal 227 will have a logical 0 output when the flip-flop has stabilized. Similarly, when low level DC signals are applied to terminals 226*a* and 226*b*, a positive DC signal at terminal 226*a* will cause terminal 227 to produce a logical 0.

If bipolar pulses 503 are to be detected, signal to ground strobing can be used. One-shot 116 is activated and transistors 221*a* and 221*b* are controlled by it. Initiator 110 transmits the initiate signal to one-shot 116 causing its "1" output terminal to generate a logical 1 signal. This signal is applied to the base of transistors 221*a* and 221*b* through their respective base resistors. This forward biases each transistor into full conduction, causing terminals 226*a* and 226*b* to be grounded. When the time constant of one-shot 116 has elapsed it resets, causing transistors 221*a* and 221*b* to stop conducting. Thus they perform the same function of grounding the output side of capacitors 114*b* and 114*b* (which must be present) that transistors 121*a* and 121*b* of FIG. 1 do. The timing involved in both setting and resetting one-shot 116 is identical to that discussed for FIG. 1.

Figure 3A:
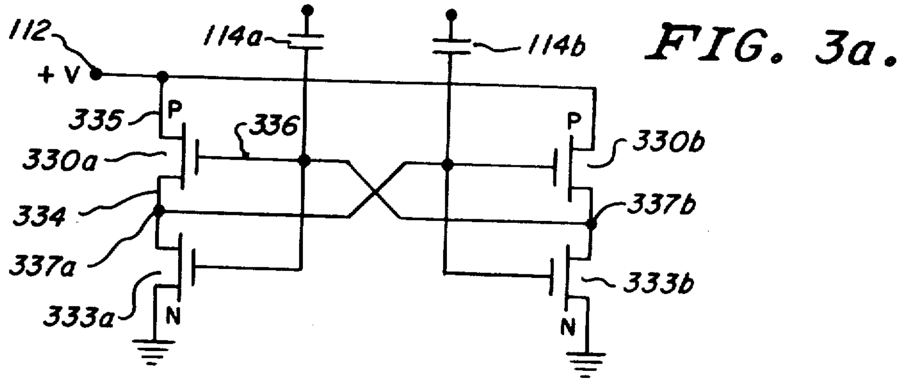
Figure 3B:
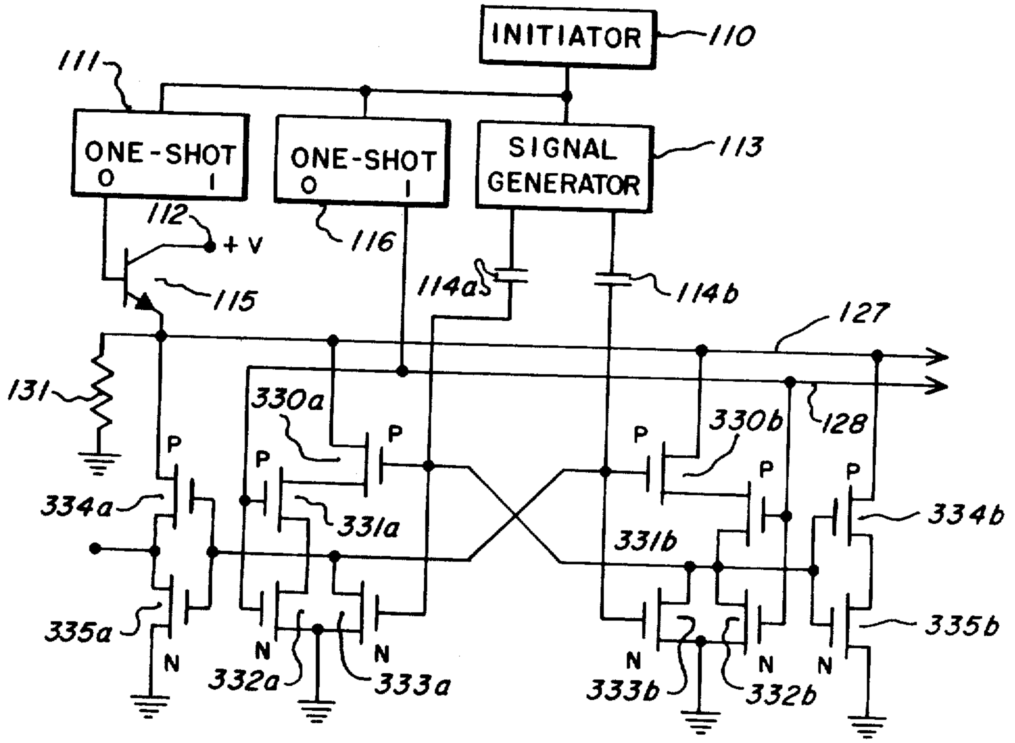

A RTL flip-flop such as shown in FIG. 2 forms one preferred embodiment because of the prepackaged availability of the complete circuit. In a sense, it is a fortuitous accident that one-half of a RTL NOR gate can be used as an inverter and the other half used as a grounding switch. But other prepackaged flipiflop circuits can also be adapted for small signal detection. FIGS. 3*a* and 3*b* show application of complementary metal oxide silicon (CMOS) logic to small signal detection. FIG. 3*a* is a simplified drawing of the basic flip-flop incorporated in FIG. 3*b*. Field effect transistors (FETs) **330*a* and 330*b* are of the depletion mode P-channel type as indicated by the "P" placed near them. P-channel FET 330*a*, illustrative of the other P-channel FETs involved, becomes a low-impedance path from source 335 to drain 334 when voltage at gate 336 is at or below the voltage at drain 334. If voltage applied to gate 336 rises to a point a few tenths of a volt greater than drain voltage, impedance of P-channel FET 330*a* becomes extremely high. Operation of enhancement mode N-channel FETs 333*a* and 333*b* is similar except that full conduction occurs when gate voltage is more than slightly above their drain voltage, in the case of FETs 333*a* and 333*b*, ground. And similarly, conduction ceases if a voltage close to or below drain voltage is applied to the gate of FETS 333*a* and 333*b*. Terminal 337*a* produces the output of the inverter formed by FETs 330*a* and 333*a*. If the gates of both these FETs are at a logical 1 voltage, e.g., 2.5 v., FET 330*a* does not, and FET 333*a* does, conduct, causing terminal 337*a* to produce a voltage very close to 0 v. Similarly, if the gates of the two FETs are held close to ground potential, FET 330*a* has low impedance and FET 333*a* has high impedance causing terminal 337*a* to produce a voltage close to 2.5 v., or a logical 1. A similar explanation applies to the inverter comprising FETs 330*b* and 333*b*. These two inverters are connected as are the inverters shown in FIG. 1, forming a similar flip-flop. Output of the flip-flop is available at terminals 337*a* and 337*b***. The circuit of FIG. 3*a* can be utilized as the cross-coupled inverter flip-flop of FIG. 1 for small signal detection. Adaptation of this CMOS circuitry to FIG. 1 may require logic voltage output from one-shot 111 different from that required by the RTL circuit adaptation in FIG. 2*a*, because of differing supply voltage requirements for the two types of circuitry. However, implementation of power strobing for this CMOS flip-flop is straight-forwardly analogous to that for RTL circuitry. Timing specified for RTL circuitry can be used in strobing power to the flop-flop of FIG. 3*a*.

FIG. 3*b* shows implementation of the simple CMOS cross-coupled inverter flip-flop of FIG. 3*a*, with both power and signal to ground strobing. FETs **330*a*, 331*a*, 332*a*, and 333*a***, comprise a NOR gate logically equivalent to the NOR gate described for the RTL circuit of FIG. 2. As with the RTL flip-flop, the 12 FETs shown in FIG. 3*b* form a standard flip-flop package readily available an as inexpensive microcircuit. Addition of transistors **331*a*, 331*b*, 332*a* and 332*b***, to the simple flip-flop of FIG. 3*a* does not change the operation of the circuit for power strobing as long as one-shot 116 remains cleared, for with the gates of FETs **331*a* and 332*a* at 0 volts, FET 331*a* be fully conductive and FET 332*a* will be completely non-conductive. When signal to ground strobing is employed, then FET 332*a* is used to short capacitor 114*b* to ground and Fet 332*b* does the same for capacitor 114*a*. FETs 331*a* and 331*b* perform no function. However, since the mass produced circuit customarily has these two FETs within it for its more usual use as two NOR gates or a flip-flop, it is cheaper to use a circuit having them. FETs 334*a* and 335*a* serve as an output driver, performing the same function that transistor 220*a* performs in the circuit of FIG. 2. FETs 334*a* and 335*a* invert the output signal and thus again provide opposite the true signal state of the left side of the flip-flop. This, of course, as stated before, is simply a matter of convention. FETs 334*b* and 335*b* provide balanced loading on each NOR gate of the flip-flop in the same fashion that transistor 220*b*** in the circuit of FIG. 2 balances the RTL flip-flop. Power strobe and signal to ground strobe must be synchronized as for the general circuit of FIG. 1.

Figure 4:
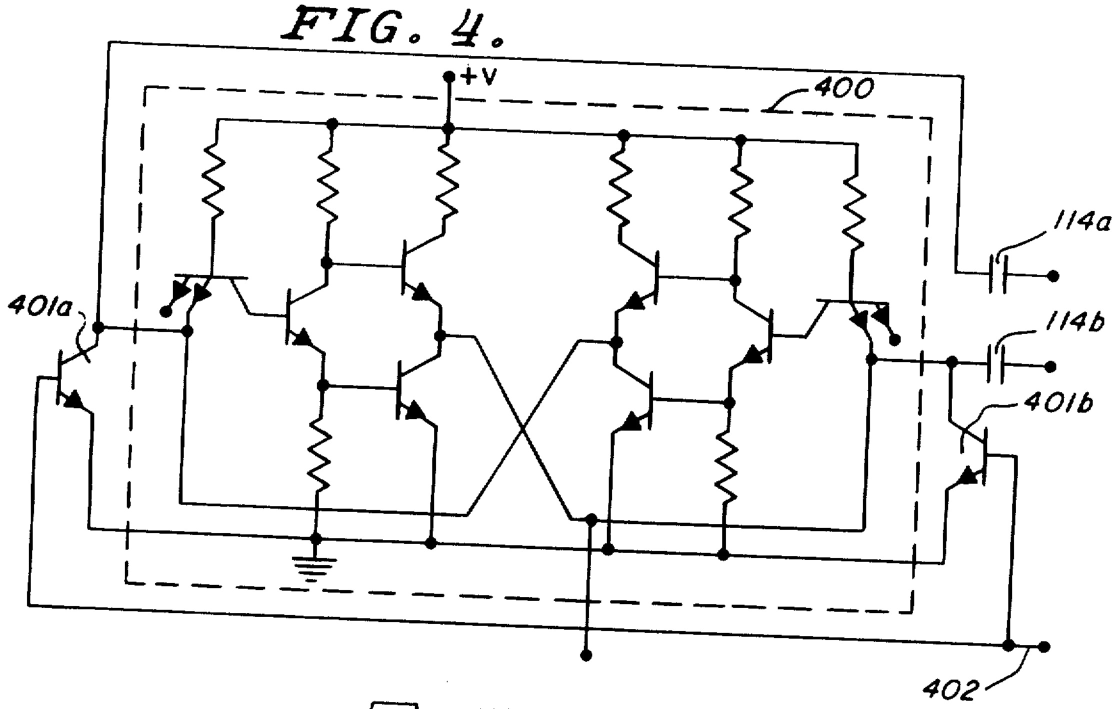

FIG. 4 is example of signal to ground strobing adapted to transistor transistor logic (TTL) circuitry. A TTL flip-flop 400 can employ power strobing as previously explained. However, no circuit components are normally present in a commercially available TTL flip-flop to do the signal to ground strobing. Therefore transistors **441*a* and 442*a* must be added to the logic as shown. The signal to ground strobe signal from one-shot 116 can be applied to terminal 402**. However, TTL circuitry is not as satisfactory for small signal detection as is RTL circuitry, because its normal threshold voltage is 1.4 v., thus causing the response to small signals to be correspondingly less good.

These same two techniques may be utilized in increasing the sensitivity of flip-flops to small signals inputs wherever the logic signal levels are voltage levels. Analogous techniques can be devised for sensitizing the response of fluidic flip-flops as well.

Having thus described my invention, what I claim is:

1. Apparatus for detecting the data content of a weak bipolar duplex signal, comprising:
   a. a flip-flop having a pair of input terminals for receiving the duplex signal;
   b. a pair of capacitors, each connecting one half of the duplex signal to one input terminal;
   c. means for grounding the input terminals of flip-flop substantially coincidentally with the start of the bipolar duplex signal, and ungrounding the input terminal substantially coincidentally with the first signal peak;
   d. control means for supplying operating power to the flip-flop responsive to a connect signal and removing operating power from the flip-flop responsive to a disconnect signal; and
   e. first timing means supplying the connect signal to the control means for activating the flip-flop synchronously with arrival of the duplex signal at the flip-flop, and supplying the disconnect signal prior to each connect signal.

2. The apparatus of claim 1 wherein the flip-flop comprises a pair of binary logic signal inverters, each having its output terminal connected to the input terminal of the other, and each inverter's input terminal receiving one half of the duplex signal and supplying flip-flop output.

3. The apparatus of claim 2 wherein each inverter comprises a transistor common emitter circuit.

4. The apparatus of claim 2 wherein each inverter comprises a pair of complementary field effect transistors having commonly connected gates and the drain of one connected to the source of the other, the pair having conduction characteristics such that a gate signal causing conduction in one will cut off the other.

5. The apparatus of claim 1 wherein the input terminal grounding means comprises:
   a. a pair of variable impedances, each connecting one flip-flop input terminal to ground, each having low impedance responsive to a ground signal and each having high impedance responsive to an unground signal; and
   b. second timing means for supplying a ground signal to the variable impedances substantially coincidentally with the start of the bipolar duplex signal and an unground signal to the variable impedances substantially coincidentally with the first signal peak.

6. The apparatus of claim 5 wherein each variable impedance includes a transistor.

7. A method for detection of bipolar duplex signals too weak to change the state of flip-flop capacitively coupled to the source of the bipolar duplex signals, comprising the steps of:
   a. grounding the flip-flop input terminals substantially coincidentally with the start of the bipolar duplex signal, and
   b. ungrounding the flip-flop input terminals substantially coincidentally with the occurrence of the first bipolar duplex signal peak.

8. The method of claim 7 further including the steps of
   a. removing power from the flip-flop prior to occurrence of the bipolar duplex signal, and
   b. reapplying power to the flip-flop so as to cause the arrival at latching power voltage to substantially coincide with the second bipolar duplex signal peak.

* * * * *